C. H. WOLCOTT.
STARTER FOR AUTOMOBILES.
APPLICATION FILED JUNE 1, 1909.

953,885.

Patented Apr. 5, 1910.
2 SHEETS—SHEET 2.

Witnesses

Charles H. Wolcott, Inventor

By C. A. Snow & Co.
Attorneys

UNITED STATES PATENT OFFICE.

CHARLES HOMER WOLCOTT, OF FORSYTH, GEORGIA.

STARTER FOR AUTOMOBILES.

953,885.     Specification of Letters Patent.     Patented Apr. 5, 1910.

Application filed June 1, 1909. Serial No. 499,287.

*To all whom it may concern:*

Be it known that I, CHARLES HOMER WOLCOTT, a citizen of the United States, residing at Forsyth, in the county of Monroe and State of Georgia, have invented a new and useful Starter for Automobiles, of which the following is a specification.

This invention relates to mechanism for starting hydrocarbon engines, the principal object of the invention being to provide pressure-operated means whereby the starting can be effected automatically.

Another object is to provide mechanism of this character designed to be actuated by fluid under pressure, such fluid being utilized for driving a motor, which, in turn, operates clutch mechanism of novel form.

A still further object is to provide a novel form of clutch for starting the engine shaft, said clutch being so constructed as to automatically disengage from the shaft as soon as the engine starts.

With these and other objects in view the invention consists of certain novel details of construction and combinations of parts hereinafter more fully described and pointed out in the claims.

In the accompanying drawings the preferred form of the invention has been shown.

Figure 1:
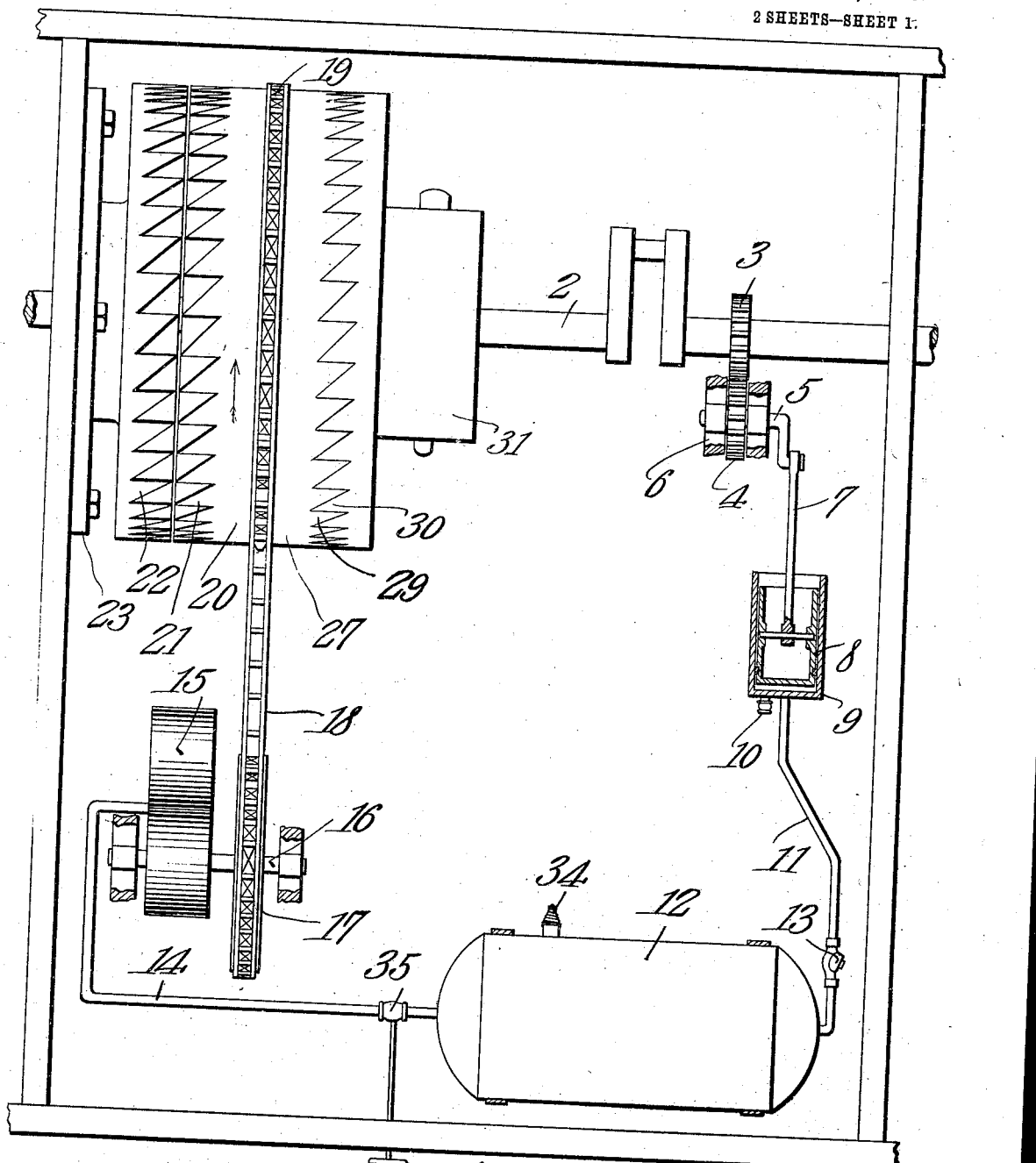
Figure 2:
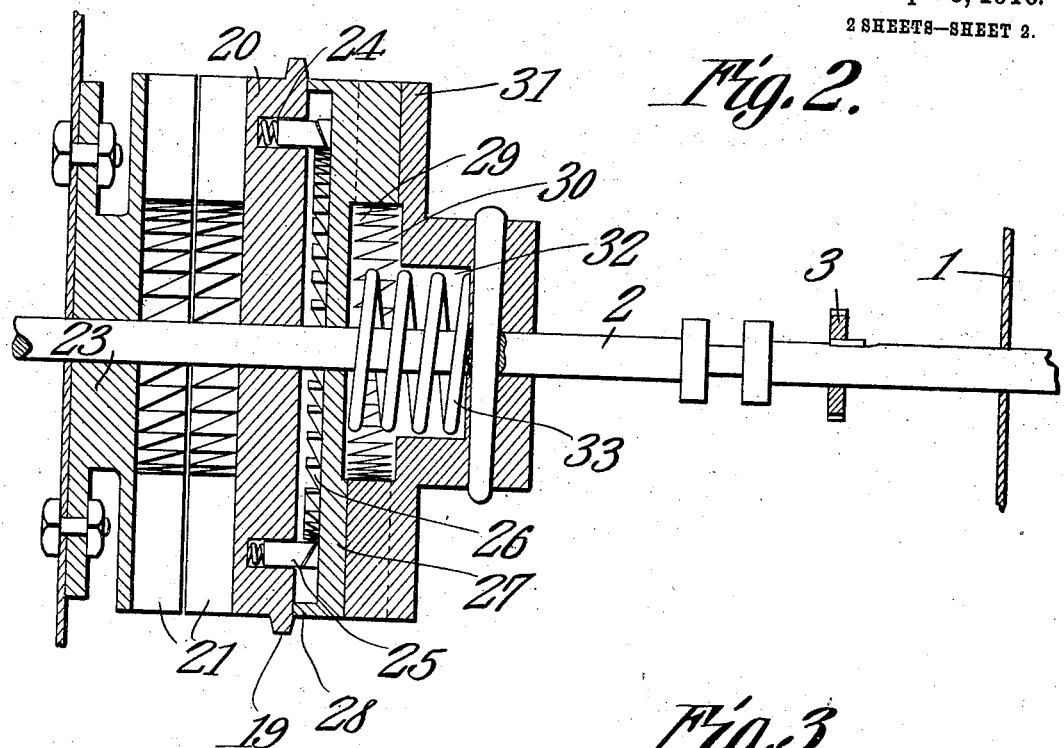
Figure 3:
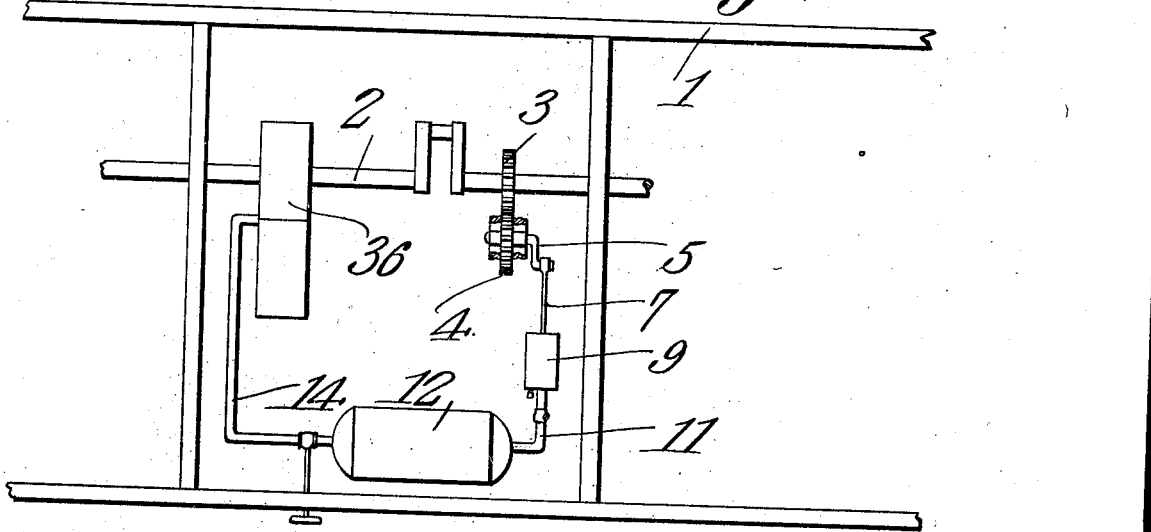

In said drawings:—Figure 1 is a plan view of a portion of a supporting frame having the present improvements applied thereto. Fig. 2 is an enlarged section through the clutch mechanism. Fig. 3 is a view similar to Fig. 1, but showing, on a reduced scale, a modified form of apparatus.

Referring to the figures by characters of reference, 1 designates a supporting structure in which an engine shaft 2 is journaled, there being a gear 3 secured to and revoluble with the shaft and meshing with another gear 4, which is secured to a crank shaft 5 mounted within suitable supports 6. A pitman 7 is connected to the crank shaft 5, and also to a piston 8, which is designed to reciprocate within a cylinder 9 having an air intake valve 10. A pipe 11 connects this cylinder with a storage tank 12, there being a check valve 13 within the pipe for preventing back pressure. A pipe 14 is employed for conveying air under pressure from the tank 12 to a rotary motor 15, the shaft 16 of which has a sprocket 17 secured thereon. This sprocket is designed to drive a chain 18 which engages and extends partly around a large sprocket 19 formed upon the intermediate member 20 of the clutch. This member is mounted loosely upon the engine shaft 2 and is provided on one face with radially extending ratchet teeth 21, which are arranged oppositely to, and normally engage similar teeth 22, formed upon a fixed clutch disk 23, which is immovably secured to the supporting frame 1. The two sets of teeth 21 and 22 are so shaped that when the clutch member 20 is rotated in one direction the inclined faces of the teeth 21 will ride along the inclined faces of the teeth 22 and automatically shift the member 20 laterally so as to cause the teeth to disengage. Sockets 24 are formed within the clutch member 20 and spring-pressed pawls 25 are slidably mounted within them and project beyond that face of the member 20 opposite the face on which the teeth 21 are formed. These pawls normally engage ratchet teeth 26 formed upon a secondary intermediate clutch member 27, there being an annular flange 28 upon the said member 27 which constitutes means for spacing the members 20 and 27 the proper distance apart. Radially extending ratchet teeth 29 project from the member 27 and are located on that face of said member which is opposite the face on which the teeth 26 are formed. These teeth 29 are designed to engage similar teeth 30, which are formed upon a collar 31, keyed or otherwise secured to the engine shaft 2, there being a central socket 32 within this member 31 and in which is seated a coiled spring 33. Said spring is designed to bear against the member 27 and hold the teeth 29 and 30 normally disengaged and the teeth 21 and 22 normally in engagement.

In Fig. 2 of the drawings the parts have been shown in the positions assumed by them while the engine is being started in the manner hereinafter described.

It is of course to be understood that when the shaft 2 of the engine is in motion the gears 3 and 4 will actuate the piston 8 through crank-shaft 5 and pitman 7 and this piston will operate to direct air under pressure into the tank 12 where it will be stored at a desired pressure, any suitable means, such as a safety valve 34, being utilized to permit escape of the stored air when the pressure reaches a predetermined point. The pipe 14 is designed to be closed by a valve 35 which can be operated manually from any suitable point. As heretofore stated, the teeth 21 normally engage the teeth 22, whereas the teeth 29 and 30 are normally disengaged. When the shaft 2 is at rest and it is desired to start the engine, the operator opens the valve 35 and the fluid under pressure promptly passes from the tank 12 to the motor 15 and causes shaft 16 and sprocket 17 to rotate. Motion will therefore be transmitted through chain 18 to the sprocket 19 and the main intermediate member 20 of the clutch will thus revolve in the direction of the arrow indicated in Fig. 1, thus causing the inclined faces of the teeth 21 to slide along the corresponding inclined faces of the teeth 22. The clutch member 20 will therefore be shifted laterally out of engagement with the teeth 22, and, at the same time, the teeth 29 will be pushed into engagement with the teeth 30. The clutch member 31 will therefore rotate and the shaft 2 will be moved therewith until the engine to which said shaft is connected has properly started. This shifting action of the member 20 of the clutch of course causes the spring 33 to compress. As soon as the engine starts and the shaft 2 rotates under its own power the supply of fluid should be cut off from the motor 15. Until this is done the spring 33 will not throw the clutch member 20 back into engagement with the clutch member 23. After the engine has started and until the compressed fluid has been cut off from the motor 15 the secondary member 27 of the clutch will remain in engagement with the clutch member 31, but the ratchet teeth 26 upon said member 27 will be free to slip past the pawls 25. Obviously this slipping action will only occur up to the time the spring 33 disengages the members 27 and 31. As soon as the shaft 2 begins to operate, the storage of air within the tank 12 is begun and the mechanism is thus ready to be again operated in the manner hereinbefore described.

If preferred, and as shown in Fig. 3, the clutch mechanism herein described can be dispensed with and a motor 36 may be mounted directly on the shaft 2. In all other respects the construction of the mechanism is the same as that hereinbefore described.

Obviously, instead of utilizing compressed air for the purpose of starting the engine, steam may be utilized where available, or, in fact, any other fluid can be employed.

It is of course to be understood that various changes may be made in the construction and arrangement of the parts without departing from the spirit or sacrificing the advantages of the invention.

What is claimed is:—

1. A starting device for explosive engines, including an engine driven shaft, a motor, a motor-driven clutch member upon the shaft, a clutch member secured to the shaft, and relatively fixed means for deflecting the revoluble clutch member into engagement with the member secured on the shaft.

2. A starting device for explosive engines, including an engine shaft, a fluid-operated motor, a relatively fixed clutch member, a clutch member secured to and revoluble with the shaft, an intermediate clutch member revolubly mounted on the shaft and actuated by the motor, and coöperating means upon the fixed and revoluble member for automatically shifting said revoluble member into engagement with the member of the shaft during the rotation of the intermediate member.

3. A starting device for explosive engines, including an engine shaft, a clutch member secured thereto, a relatively fixed clutch member, a sectional intermediate clutch member revolubly mounted upon the shaft, a pawl and ratchet connection between said sections, a fluid-operated motor for actuating the intermediate member, and coöperating means upon the fixed and intermediate members for shifting said intermediate member during its rotation into engagement with the member secured to the shaft.

4. A starting mechanism for explosive engines, including an engine shaft, a clutch member revoluble therewith, a relatively fixed clutch member, mounted for rotation on the shaft, fluid-operated means for actuating said intermediate member, means interposed between the intermediate and shaft members of the clutch for holding said intermediate member normally in engagement with the fixed member, said fixed and intermediate members having integral means for deflecting the intermediate member when rotated to bring it into engagement with the shaft member.

5. Starting mechanism for explosive engines, including an engine shaft, a clutch member secured thereto and revoluble therewith, a fixed clutch member, an intermediate clutch member loosely mounted upon the shaft and between the first members, power-operated means for rotating the intermediate member, means interposed between the shaft and intermediate members of the clutch for holding said intermediate member normally in engagement with the fixed clutch member, said fixed and intermediate members having coöperating means for automatically shifting the intermediate member into engagement with the shaft member when said intermediate member is rotated in one direction, said intermediate clutch member including movably connected sections and pawl and ratchet connections therebetween.

6. Starting mechanism for explosive engines, including an engine shaft, fluid-compressing means actuated thereby, a motor, means for directing fluid under pressure to the motor, a clutch member secured to and revoluble with the shaft, a fixed clutch member, an intermediate clutch member revolubly mounted on the shaft, said fixed and intermediate members having coöperating means for shifting the intermediate member laterally into engagement with the shaft member during the rotation of the intermediate member in one direction, means operated by the motor for rotating said intermediate member, and means for automatically disengaging the shaft and intermediate members of the clutch subsequent to the rotation of the intermediate member in the other direction.

7. Starting mechanism for explosive engines, including an engine shaft, fluid-compressing means actuated thereby, a motor, means for directing fluid under pressure to the motor, a clutch member secured to and revoluble with the shaft, a fixed clutch member, an intermediate clutch member revolubly mounted on the shaft, said fixed and intermediate members having coöperating means for shifting the intermediate member laterally into engagement with the shaft member during the rotation of the intermediate member in one direction, means operated by the motor for rotating said intermediate member, and means for automatically disengaging the shaft and intermediate members of the clutch subsequent to the rotation of the intermediate member in the other direction, the intermediate clutch member consisting of separately revoluble sections, and pawl and ratchet connections therebetween.

In testimony that I claim the foregoing as my own, I have hereto affixed my signature in the presence of two witnesses.

CHARLES HOMER WOLCOTT.

Witnesses:
J. P. CARSON,
A. C. MERRITT.